July 24, 1956  W. A. KURT  2,755,810
DRAIN PLUG VALVE FLUSHING DEVICE
Filed Jan. 18, 1956
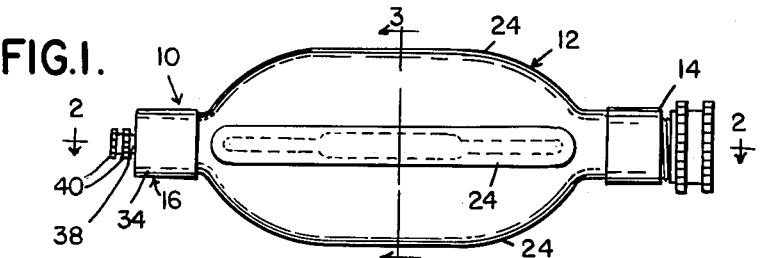
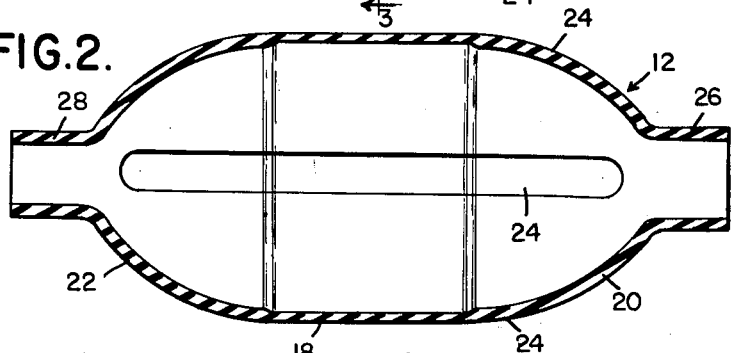
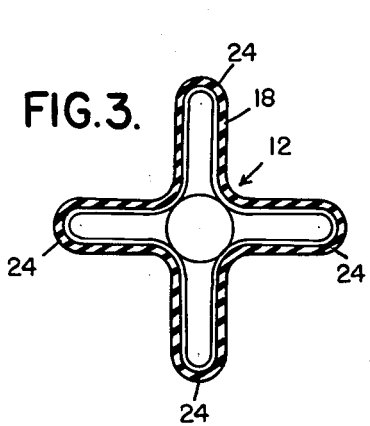
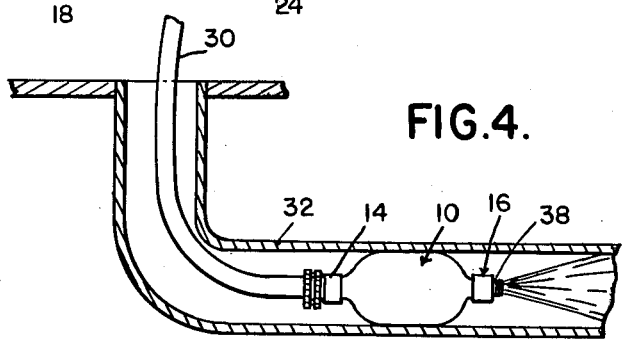
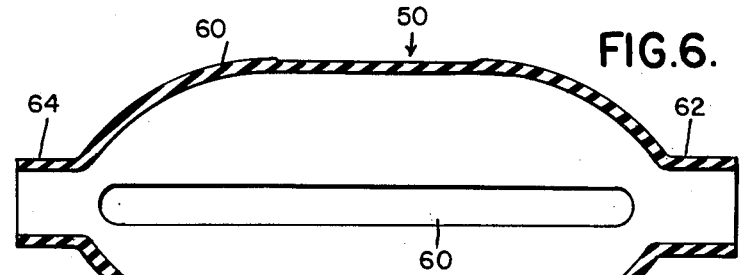
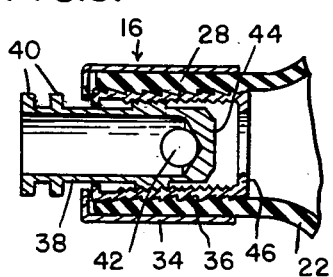
*INVENTOR.*
WINFRED A. KURT
BY
ATTORNEY United States Patent Office 2,755,810
Patented July 24, 1956

2,755,810

DRAIN PLUG VALVE FLUSHING DEVICE

Winfred A. Kurt, East Detroit, Mich., assignor to Midwest Rubber Company, East Detroit, Mich., a corporation of Michigan Application January 18, 1956, Serial No. 560,001

8 Claims. (Cl. 134—167)

This invention relates to a drain plug valve flushing device, and more particularly to such a device having a substantially stiff, yet flexible, body member permitting positive insertion and propulsion into and along drain lines for flushing purposes with a minimum of buckling, collapse or telescoping, and adapted to provide a controlled jet stream of fluid into the drain line whereby a column of the fluid is developed and moved against an obstruction in the drain line.

The invention of this application embodies improvements in the device disclosed in my co-pending patent application Serial No. 494,443, filed March 15, 1955, for "Drain Plug Valve Flushing Device."

The device of this invention embodies a body member which is preferably made of rubber, although elastic flexible and resilient materials, such as synthetic rubber, neoprene, and the elastic plastisols and organosols may also be used in place of rubber. The body member is formed along its principal portion in a cruciform or X-design, in which the wall thickness of the forward and rearward portions thereof is heavier and thicker than that of the central portion. The purpose and function of this feature is to provide a faster and initial expansion of the central portion of the body member and to limit and slow down the rate of expansion of the forward and rearward portions. The wall thickness variation in the described sections of the body member is preferably molded into it so that a complete unitary and integral member is formed. Dipping of a preformed mandrel may also be one method of forming and producing the member, the resultant product having an exterior variation in surface contour. On the other hand, by the molding process, an interior variation in surface contour is provided that appears to have somewhat greater strength and resistance to collapse and telescoping when applied in use due to its smooth outside surface. Another advantage of the smooth exterior obtained by molding is the reduced resistance to propulsion along a drain line, which a variation in exterior surface contour would be inclined to produce. Another important feature constituting an improvement over the earlier developed device above referred to is the incorporation of a valving mechanism at the outlet end of the body member whereby the issuing jet stream may be adjusted from full open position to closed position. The purpose and function of the valving device is three-fold: to adjust the fill and expansion pressure in the body member to the varying tap water pressures, to control the rate of output force generated in the obstructed drain line, and to prevent a closing off of the output end of the body member, due to any uncontrollable bending or twisting of the body member upon filling with fluid.

Inasmuch as my copending application above referred to contains a full and accurate description of the function and value of the cruciform design of the body member, it is not considered necessary to repeat in great detail these particular aspects of the device. However, the fluted form of the body member which is now provided with heavier and thicker wall sections at the forward and rearward ends thereof and with a relatively thinner wall section in the central portion permits the application of considerably greater pressure within the body member without danger of rupture or causing the output end to twist or bend into the side of the drain line so as to close off the flow of fluid. The cross-sectional wall thickness of the body member at every portion, of course, is maintained at a point to fully satisfy an essential requirement and function of the device, namely that it may be propelled through a drain line for a considerable distance without buckling, collapsing or telescoping.

It is to be clearly understood throughout this specification and claims that the variation in wall thickness between one portion of the body member and another, whether appearing on the inside surface or the outside surface, does not result in sharp ridges or lines of demarcation between the adjacent wall sections. These wall sections are provided with smooth blended curves where the heavier wall meets the lighter thinner wall section, in order to improve the effective operation and function of the device.

The inlet end of the body member is provided with a suitable fitting to which a hose connection may be joined for passing a fluid into the body member to distend the same to the diameter of the drain conduit in which it is located. Being made of a flexible, resilient and tough material, such as rubber, the body member upon inflation and distension adapts itself to the configuration and surface contour of the inside wall of the drain line so as to seal it off from back flow and to plug the drain line by firmly gripping the inside wall surface under hydraulic pressure generated within the body member by the fluid being passed thereinto.

The exit or outlet area, restricted by the adjustable valve fitted to the outlet end of the body member, causes pressure to build up within the body member and to generate a jet stream of considerable velocity. The outlet area can be varied by adjustment of the outlet valve, but is always less than the area at the inlet portion of the body member.

It is therefore an object of the invention to provide a drain plug valve flushing device embodying variations in wall thickness within prescribed portions of its body member, so that the relative rate of inflation and distension of these portions may be controlled and varied. It is another object to provide a body member in which the central portion is more easily and quickly inflatable than either of the end portions immediately adjacent thereto. A further object is to provide an adjustable variable area fluid outlet in the body member, the maximum area of the outlet being always less than the fluid inlet area. Still another object is to provide an adjustable variable outlet valve which cannot be closed off by movement of the body member while in operating position.

These and other objects of the invention and features of construction will become more clearly apparent from the description given below. The terms are used for purposes of description and not of limitation. Referring now to the drawing annexed hereto and made an integral part hereof, showing a preferred embodiment of the invention, Fig. 1 is a side elevation of the inventive device, in reduced scale.

Fig. 2 is a horizontal longitudinal cross-sectional view of the body member taken substantially on the line 2—2 of Fig. 1.

Fig. 3 is a vertical cross-sectional view taken substantially on the line 3—3 of Fig. 1.

Fig. 4 is a vertical sectional view in reduced scale, showing the device in use in a drain line.

Fig. 5 is a vertical sectional view, in slightly enlarged scale, of the outlet end of the device showing particularly the arrangement of the valve with respect to the body member.

Fig. 6 is a sectional view similar to Fig. 2 showing a slight modification in the form of the body member.

As shown in the drawing, the drain plug valve flushing device 10 comprises a body member 12, an inlet fitting 14 and an outlet valve fitting 16.

The body member 12 is a concave, hollow, flexible, resilient member, preferably made of rubber molded to form. However, the body member may also be made by the dipping process, as will be described in more detail when the body member of Fig. 6 is discussed below. Body member 12 comprises a central portion 18, an inlet portion 20 and an outlet portion 22. All of the central portion 18 and substantially the major areas of the inlet and outlet portions, 20 and 22, are arranged in a folded or convoluted form as shown. The cross-sectional arrangement of these folds 24, shown in Fig. 3, describes a cruciform design.

The inlet nipple end 26 and the outlet nipple end 28 are provided with the fittings 14 and 16 respectively, which are mounted thereon and held thereto by mechanical pressure and suitable adhesives, means well known and long used in the art to which the invention pertains.

The stiffness characteristic of the folds 24 is directly related to the wall thickness of the portions 20, 18 and 22. The section thickness of the inlet and outlet portions 20 and 22 is substantially heavier than that of central portion 18. For instance, in a body member 7¾ inches long, in which the tapered inlet portion 20 is 3 inches long with a maximum distance across the folds of 2¾ inches, and having an inlet nipple of ¾ inch inside diameter by 1 inch long, the wall section thickness is preferably ⅛ inch. The outlet portion 22 at the opposite end of the body member has substantially the same wall thickness, the inside diameter of the outlet nipple being ⅝ inch, its length being ¾ inch. But the central portion 18, which is substantially straight and inflatable into a cylinder, has a wall section thickness of 3/32 inch. All three portions, being integrally formed and molded together, provide a fluted body member 12 which is more readily inflatable and distensible in its central portion 18, while the inlet and outlet portions 20 and 22 inflate and distend more slowly and to a more limited extent. By reason of this construction, bending and twisting of the outlet end of the body member, under its internal hydraulic pressure, is reduced to a negligible factor, and the danger of rupture of the body member is also substantially reduced.

Tests made under actual field conditions were carefully observed, and it was found that there was no appreciable turning of the outlet fitting when considerable pressure was generated within the improved body member 12, so that the effective force of the jet stream issuing from valve fitting 16 was maintained without loss.

A water line 30, such as a garden hose, is threaded into or otherwise affixed to the fitting 14. When water is passed through line 30 into device 10, it fills the body member 12, due to flow resistance at the outlet valve 16, causing the folds 24 to swell and expand. As the fluted portion of member 12 expands into a substantially circular sectional form, the central portion 18 of the fluted area, which is straight, becomes substantially cylindrical. As more fluid is entrapped in body member 12, it distends and enlarges to fill the inside of drain line 32. Any irregularities present in the drain line are accepted by the rubber body member 12 and the line is completely sealed off from back flow or leaking.

The folds 24 are so designed that the material lying between the folds, in a plane normal to the longitudinal axis of the body member, when expanded loses its involute form to assume the form substantially of a circular cross-section. The peripheral length of a cross-section through the fluted involute cruciform design is slightly greater than the circumference of the circle formed by a diameter taken across the folds. This form develops when the body member fills with fluid. As the rubber body member 12 expands and reaches the full inside diameter of the drain line, the amount of land contact therewith increases longitudinally as the internal pressure increases. However, the longitudinal stretch in the instant device is relatively limited by the resistance of the increased wall section thickness at the inlet and outlet portions 20 and 22, so that rupture and bending and twisting of the body member is reduced to a minimum.

In Fig. 5 is shown a vertical section of the adjustable variable outlet valve fitting 16, which comprises an outer ferrule 34, and an inner sleeve 36 threaded on a portion of its inner surface to receive an externally threaded valve 38 having its digital end 40 knurled for easier manual turning. The outer surface of sleeve 36 is provided with annular ring serrations arranged to closely grip the inside wall surface of outlet nipple end 28 and to resist outward thrust. Two 180°-opposed exit ports 42 are located adjacent the rear of the valve 38 to pass fluid therethrough from the body member 12. As the valve 38 is screwed toward the rear of inner sleeve 36 its rear face 44 closes against and seats on the inturned flange 46 of inner sleeve 36, to close off the flow of fluid. Manually advancing valve 38 outwardly opens the passage for emission of fluid. Thus, it will be observed that device 10 can be used as a drain plug to stop up a drain line, as well as to flush it out. This is accomplished by simply closing valve 38 in sleeve 36 and filling the body member 12 with fluid until the drain line is completely closed by the expanded body member. This function of the device 10 is very valuable where sewer back-up is a constant problem.

It will be recognized that a folded or convoluted form comprising three or more folds or convolutions may be used in place of the preferred four folded, cruciform design here described. To provide the necessary stiffness characteristic required for drain line insertions, the folds should be spaced apart from each other by a valley or trough integrally formed of the resilient flexible material. This construction, together with adequate wall thickness, imparts such stiffness for satisfactory use as the device requires. The depth of the valleys or involutions between the folds is also related to the stiffness characteristic of the body member, as well as to the length of the arc between the crests of the folds when the body member is fully filled with fluid prior to distension.

Although four folds have been thoroughly tested and found satisfactory for a device 10 which is to be propelled along through a drain line, more than four folds may be desirable in order to obtain a greater ratio between the inflated diameter and the relaxed diameter. By adding folds, with their intermediate valleys, the normal expansion of the body member 12, upon filling, will produce a cross-sectional diameter somewhat greater than the diameter of the body member in its relaxed state. This increase in size occurs before distension of the body member.

In operation, the device 10 is connected to the hose or fluid conduit 30 at the inlet fitting 14. Valve 38 is adjusted to the desired position to pass a jet stream of flushing fluid into drain line 32. Fluid is passed into body member 12, filling it, as a result of restricting the outlet area, and expanding it to a diameter which seals off drain line 32. Because the wall thickness of the forward and rearward portions 22 and 20 is heavier than that of the central portion 18, the latter section expands more rapidly and meets the inside wall of the drain line 32 before either of the other portions of the body member 12. The heavier wall thickness of these end portions provides a greater resistance to bending or twisting under the flow of fluid and its internal pressures and velocities, which have been found in body members of constant wall thickness to have a tendency to turn the outlet end nipple to one side or the other. Another desirable result of the heavier sections is to control and reduce longitudinal stretch so that the possibility of rupture at either end is reduced to a minimum. It is in these end portions that the greatest stretch takes place due to a lack of wall resistance, and therefore under excessive pressures and velocities, rupture may occur.

The outlet valve fitting 16 provides the following important advantage. It has been found that tap water pressures vary from area to area and district to district. And further, within each district there is a variation in the tap water pressure at different times of the day and night. The valve fitting 16 has been incorporated in device 10 to correct for these variations in water pressure at the inlet end of the body member.

It has been found that for body members fabricated of rubber, as shown and described herein, the units fill and expand at a pressure of less than four pounds per square inch, and that they grow and distend at four pounds and more. It has been observed that four pounds internal pressure holds the body member secure in a drain line for practically all flushing operations and does a very good job. When an obstructed drain line becomes charged with water from the device 10, a certain amount of back pressure is built up in the obstructed area, and it is important to maintain an internal pressure in device 10 sufficient to prevent rearward movement of the device under this back pressure. Tests show that four pounds or more pressure in the body member holds it in flushing position in a drain line and resists any movement to the rear.

In operation, the valve 38 should be adjusted to provide a smaller exist orifice when the tap water pressure is lower; and when the water pressure is somewhat higher, the exit orifice should be made larger by advancing the valve 38 in its sleeve 36.

A modification of body member 12 is shown in Fig. 6, wherein body member 50 comprises a central portion 52, an inlet portion 54 and an outlet portion 56. It is to be observed that the wall thickness of these portions is not the same, central portion 52 being substantially thinner in wall section than either of the portions 54 and 56, which are substantially the same. Also, it should be noted that the configuration and surface of the body member 50 is the reverse of that of body member 12. Where the body member 12 has a smooth exterior surface, the member 50 has a change in surface contour at the lines 58—58, where the outer end portions 54 and 56 curve in to meet the central portion 52, due to the variation in wall thickness of these portions. The inner surface of the member 50 is smooth and regular throughout as contrasted to the irregular inner surface contour of the body member 12. Folds 60 arranged in the cruciform design shown in Figs. 1–3 inclusive provide the many advantages above described for body member 12. An inlet end 62 and an outlet end 64 are provided to receive the fittings, 14 and 16 respectively, as in device 10.

This form and configuration of Fig. 6 is developed by the dipping process, wherein a mandrel having the desired shape and size is dipped into liquid rubber, partially cured and then redipped at either end one or more additional times to apply more layers of the rubber material, followed by a curing step. The resultant product is substantially the same as that first described in that central portion 52 inflates and distends before either or both of the end portions inflate and distend.

To summarize, the body members 12 and 50, each having a central portion of lesser wall thickness than their adjacent outer end portions provide a substantial improvement in sealing the flushing device in a drain line, preventing excessive longitudinal stretch which may result in rupture, and preventing bending or twisting of the outlet end that may result in closing off the outlet opening or reducing efficiency in the jet stream issuing therefrom. The outlet valve fitting 16 provides a substantial improvement in enabling the user to adjust the device to the tap water pressures in his area at the time of use. Also, the valve fitting being constructed of metal and arranged as described prevents closing off of the outlet end, even if that end is bent or twisted against the drain line by severe distortion of that end of the body member.

Having described my invention in its simplest terms, it is to be understood that the details of construction may be changed and varied in greater or lesser degree without departing from the essence of my invention which is defined in the appended claims.

I claim:

1. A drain plug valve flushing device comprising a longitudinally fluted expandable concave hollow body member of resilient flexible material having a substantially straight central portion conjoined to integral tapering inlet and outlet potrions at the ends thereof, a fitting mounted on said inlet portion for connection to a source of fluid, an adjustable variable valve mounted on said outlet portion at the end thereof to control the emission of said fluid and to adjust the emission of fluid to the inlet fluid pressure, said inlet portion having an opening therethrough into said body member of substantially larger cross-sectional area than the opening through said outlet portion, said central portion and the major areas of said inlet and outlet portions being arranged in a cruciform design in cross-section when in relaxed state, said central portion having a substantially thinner wall thickness that that of said inlet and outlet portions whereby more rapid expansion will occur in said central portion upon filling said body member with fluid under pressure and said inlet and outlet pressures will expand more slowly and resist distension to a greater degree than said central portion, said body member having a stiffness characteristic proportional to wall thickness whereby said cruciform design is substantially constantly maintained prior to filling said body member with fluid, sufficient to prevent buckling, collapse and telescoping of said body member as it is propelled along through a drain line in flushing position, the cross-sectional peripheral length around said fluted cruciform design being slightly greater than the circumference of a circle having a diameter equal to the distance across the folds of said body member, said straight central portion being expandable and distensible into a cylindrical form when said body member is filled with fluid.

2. A drain line plug valve flushing device comprising a longitudinally fluted hollow inflatable body member of resilient flexible material having a stiffness characteristic proportional to wall thickness sufficient to prevent collapsing, buckling and telescoping when inserted into and propelled along through a drain line, said body member having a substantially straight central portion integrally conjoined to tapering inlet and outlet portions at the ends thereof, a metallic fitting mounted on said inlet portion for connection to a source of fluid, an adjustable variable metallic outlet valve fitting secured to said outlet portion to control the emission of said fluid and to adjust to the inlet fluid pressure, the inlet area being substantially greater than the outlet area to provide a pressure in said body member sufficient to expand and distend said body member when said body member is filled with fluid, the substantially major portion of said fluted body member being arranged in a cruciform design in cross-section when in relaxed state, said central portion having a substantially thinner wall section than said inlet and outlet portions to provide for more rapid expansion of said central portion into a substantially cylindrical form to make full contact with said drain line when said body member is filled with fluid, said inlet and outlet portions having a wall thickness sufficient to resist expansion at the same rate and to the same extent as that of said central portion and to control excessive longitudinal stretch.

3. A drain line plug valve flushing device comprising an inflatable integrally formed body member of resilient flexible material having a substantially straight central portion and tapering inlet and outlet portions at the ends thereof, said body member having substantially its entire area arranged in a longitudinally fluted, hollow, cross-sectional cruciform design of four folds in planes normal to each other and having a stiffness characteristic proportional to wall thickness sufficient to prevent buckling, collapse and telescoping of said body member when inserted into and propelled along through a drain line in flushing position, said inlet and outlet portions having wall sections throughout substantially thicker and heavier than that of said central portion to provide for a variation in the rate of expansion and distension upon filling said body member with fluid, said inlet portion being adapted to connect to a source of fluid for filling and inflating said body member, said inlet end having a substantially larger cross-sectional area than said outlet end, said body member being inflatable at its central portion into a substantially cylindrical section when expanded into contact with the interior wall surface of a cylindrical drain line.

4. The structure defined in claim 3, in which said outlet end is fitted with an adjustable variable metallic outlet valve secured thereto to control the emission of fluid and to adjust the internal fluid pressure in said body member to the inlet fluid pressure.

5. A drain plug valve flushing device comprising a body member of resilient flexible material having tapering inlet and outlet portions at the ends thereof, said body member being hollow throughout, inflatable, and having a longitudinally convoluted configuration arranged in cross-section in a symmetrical manner with radially extending folds having valleys therebetween to provide a stiffness characteristic to said body member sufficient to prevent buckling, collapse and telescoping of said member when inserted into and propelled along through a drain line in flushing position, said stiffness characteristic being proportional to wall thickness and being a function of said convoluted design, said inlet opening being substantially larger in cross-sectional area than said outlet opening, said inlet portion having a fluid connection fitting secured thereto at its terminal end to connect to a source of fluid to fill and inflate said body member, said body member having a substantially straight central portion integrally conjoined with said inlet and outlet portions and being of substantially thinner wall section than that of said inlet and outlet portions to provide more rapid distension of said central portion when said body member is filled with fluid, said body member being inflatable into a substantially cylindrical section at its central portion.

6. The structure defined in claim 5, in which the exterior surface contour of said body member is smooth and free of annular ridges and humps.

7. The structure defined in claim 5, in which the interior surface contour of said body member is smooth and free of annular ridges and humps, the exterior surface of said body member being higher at said thicker inlet and outlet portions than at said thinner central portion.

8. The structure defined in claim 5, in which said outlet portion is terminally fitted with a manually adjustable variable metallic outlet valve secured thereto to control the emission of fluid and to adjust the internal fluid pressure in said body member to the inlet fluid pressure.

References Cited in the file of this patent

UNITED STATES PATENTS

| | | |
|---|---|---|
| 1,848,269 | Peterson | Mar. 8, 1932 |
| 2,273,984 | Osborn | Feb. 24, 1942 |
| 2,413,997 | Rosa | Jan. 7, 1947 |